(12) United States Patent
Narayanappa et al.

(10) Patent No.: US 11,921,653 B2
(45) Date of Patent: Mar. 5, 2024

(54) DATA STORAGE DEVICE AND METHOD FOR LANE DETECTION AND CONFIGURATION

(71) Applicant: Western Digital Technologies, Inc., San Jose, CA (US)

(72) Inventors: Anil Kumar Kolar Narayanappa, Bangalore (IN); Yogesh Tayal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/828,334

(22) Filed: May 31, 2022

(65) Prior Publication Data

US 2023/0385210 A1 Nov. 30, 2023

(51) Int. Cl.
*G06F 13/16* (2006.01)
*G06F 13/38* (2006.01)
*G06F 13/42* (2006.01)

(52) U.S. Cl.
CPC ........ *G06F 13/1694* (2013.01); *G06F 13/382* (2013.01); *G06F 13/4282* (2013.01); *G06F 2213/0042* (2013.01)

(58) Field of Classification Search
CPC .............. G06F 13/1694; G06F 13/382; G06F 13/4282; G06F 2213/0042
See application file for complete search history.

(56) References Cited

U.S. PATENT DOCUMENTS

| | | | |
|---|---|---|---|
| 2014/0101345 A1* | 4/2014 | Ranta ................. | G06F 13/4081 710/16 |
| 2017/0147526 A1* | 5/2017 | Chen .................. | G06F 13/4068 |
| 2019/0196924 A1* | 6/2019 | Gregg ................. | G06F 13/105 |
| 2019/0286597 A1* | 9/2019 | Chiba ................. | G06F 13/4282 |
| 2019/0288532 A1* | 9/2019 | Mattos ................ | H02J 7/0034 |
| 2021/0157762 A1* | 5/2021 | Kwon .................. | G06F 13/385 |

* cited by examiner

*Primary Examiner* — Henry Tsai
*Assistant Examiner* — Harry Z Wang
(74) *Attorney, Agent, or Firm* — Crowell & Moring LLP

(57) ABSTRACT

A data storage device and method for lane detection and configuration are provided. In one embodiment, a data storage device is provided comprising a memory, an interface, and a controller. The controller is configured to detect whether a cable coupled with the interface is providing a first channel configuration signal that indicates that the cable is in a first cable orientation or a second channel configuration signal that indicates that the cable is in a second cable orientation. In response to detecting that the cable is not providing either the first or the second channel configuration signal, the controller uses a default lane configuration to communicate with the host via the cable. Other embodiments are possible, and each of the embodiments can be used alone or together in combination.

18 Claims, 12 Drawing Sheets

DATA STORAGE DEVICE AND METHOD FOR LANE DETECTION AND CONFIGURATION

BACKGROUND

Some data storage devices are configured to detect an orientation of a cable connected to the data storage device and configure the number of lanes used to communicate with a host. However, several issues can arise that prevent the data storage device from detecting the orientation and configuring the lanes. These issues include, for example, a lack of a required resistor in the cable, noise in the cable, and invalid information read from the cable.

DETAILED DESCRIPTION

Overview

Figure 1A:
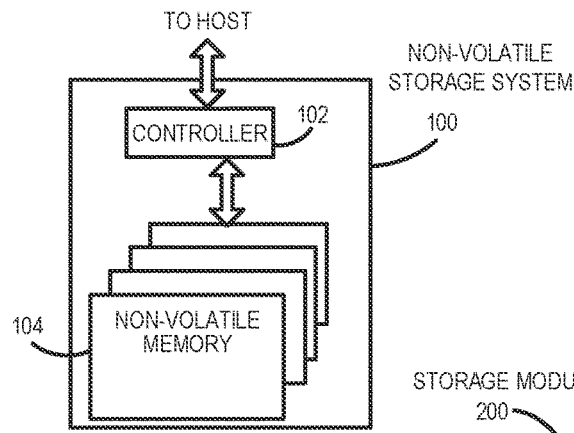
FIG. 1A is a block diagram of a data storage device of an embodiment.

By way of introduction, the below embodiments relate to a data storage device and method for lane detection and configuration. In one embodiment, a data storage device is provided comprising a memory, a controller, and an interface configured to couple with a cable. The controller is configured to detect whether the cable is providing a first channel configuration signal that indicates that the cable is in a first cable orientation or a second channel configuration signal that indicates that the cable is in a second cable orientation; in response to detecting that the cable is providing the first channel configuration signal, use a first lane configuration to communicate with a host via the cable; in response to detecting that the cable is providing the second channel configuration signal, use a second lane configuration to communicate with the host via the cable; and in response to detecting that the cable is not providing either the first or the second channel configuration signal, use a default lane configuration to communicate with the host via the cable.

In some embodiments, the controller is further configured to check for the first and second channel configuration signals a threshold number of times before using the default lane configuration.

In some embodiments, the controller is further configured to insert a delay between the checking for the first and second channel configuration signals.

In some embodiments, the cable is not providing either the first or the second channel configuration signal due to a lack of an orientation-handling circuit in the cable.

In some embodiments, the interface comprises a pull-down resistor and the orientation-handling circuit comprises a pull-up resistor.

In some embodiments, the cable comprises an orientation-handling circuit but the first or the second channel configuration signal is undetectable due to noise or invalid information.

In some embodiments, the interface comprises a universal serial bus Type C interface.

In some embodiments, an interface in the host comprises a universal serial bus Type A interface.

In some embodiments, the default lane configuration is set in a fuse.

In some embodiments, the memory comprises a three-dimensional memory.

In another embodiment, a method is provided comprising detecting whether a cable connected with the data storage device is providing a first cable orientation signal or a second cable orientation signal; in response to detecting that the cable is providing the first cable orientation signal, using a first channel configuration to communicate with a host via the cable; in response to detecting that the cable is providing the second cable orientation signal, using a second channel configuration to communicate with the host via the cable; and in response to detecting that the cable is not providing either the first or the second cable orientation signals, using a default channel configuration to communicate with the host via the cable.

In some embodiments, the method further comprises checking for the first and second cable orientation signals a threshold number of times before using the default channel configuration.

In some embodiments, the method further comprises inserting a delay between the checking for the first and second cable orientation signals.

In some embodiments, the cable is not providing either the first or the second cable orientation signal due to a lack of an orientation-handling circuit in the cable.

In some embodiments, the interface comprises a pull-down resistor and the orientation-handling circuit comprises a pull-up resistor.

In some embodiments, the cable comprises an orientation-handling circuit but the first or the second cable orientation signal is undetectable due to noise or invalid information.

In some embodiments, the interface comprises a universal serial bus Type C interface.

In some embodiments, an interface in the host comprises a universal serial bus Type A interface.

In some embodiments, the default channel configuration is set in a fuse in the data storage device.

In another embodiment, a data storage device is provided comprising a memory; an interface configured to couple with a cable; means for detecting whether the cable is providing a first channel configuration signal that indicates that the cable is in a first cable orientation or a second channel configuration signal that indicates that the cable is in a second cable orientation; and means for using a default lane configuration to communicate with a host via the cable in response to detecting that the cable is not providing either the first or the second channel configuration signal.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
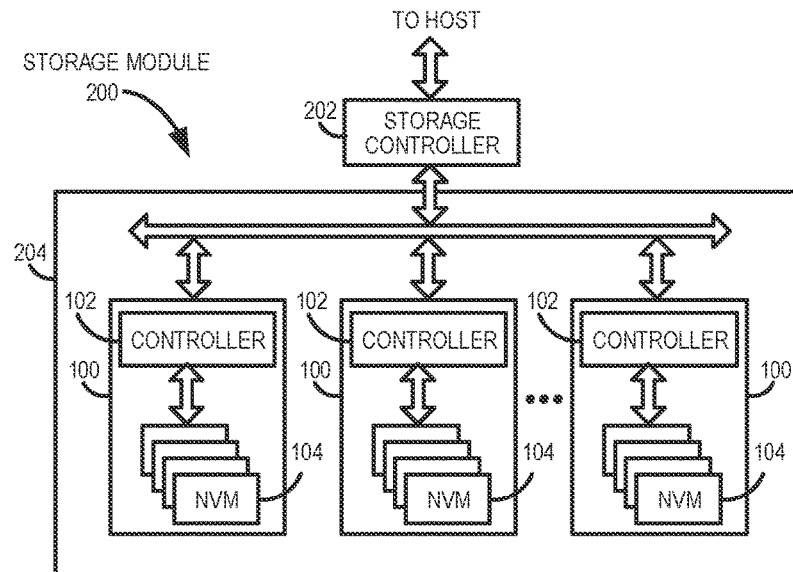
FIG. 1B is a block diagram illustrating a storage module of an embodiment.
Figure 1C:
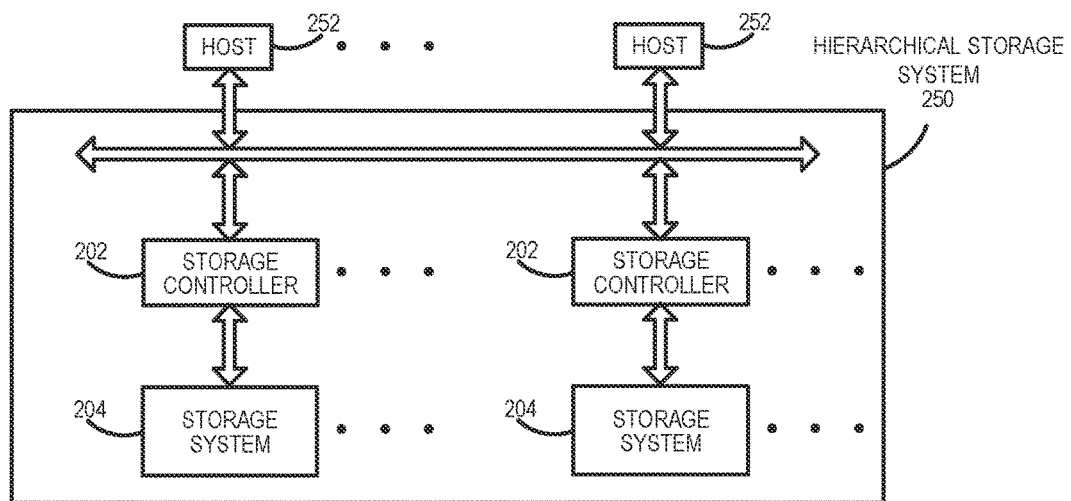
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
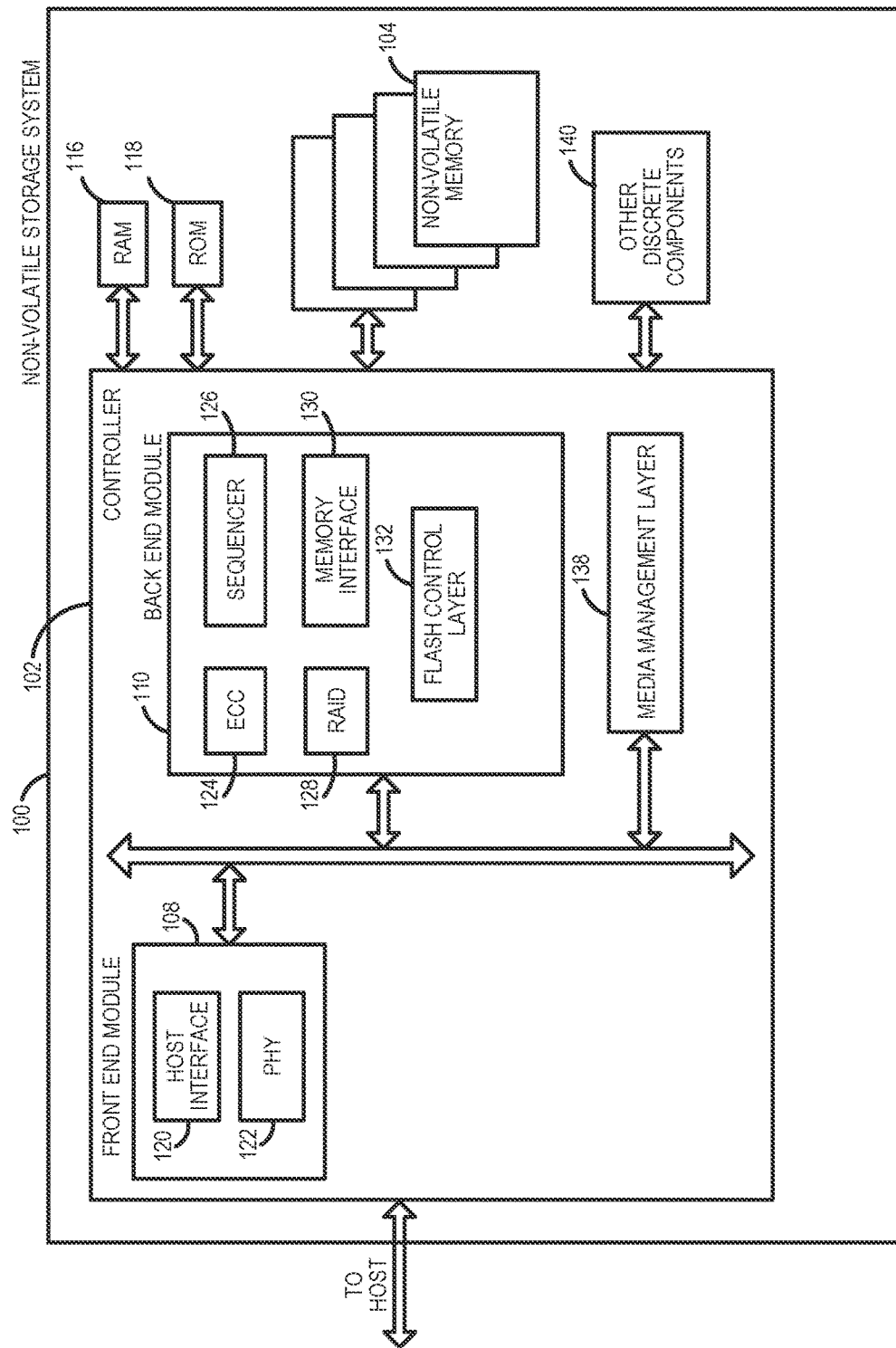
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
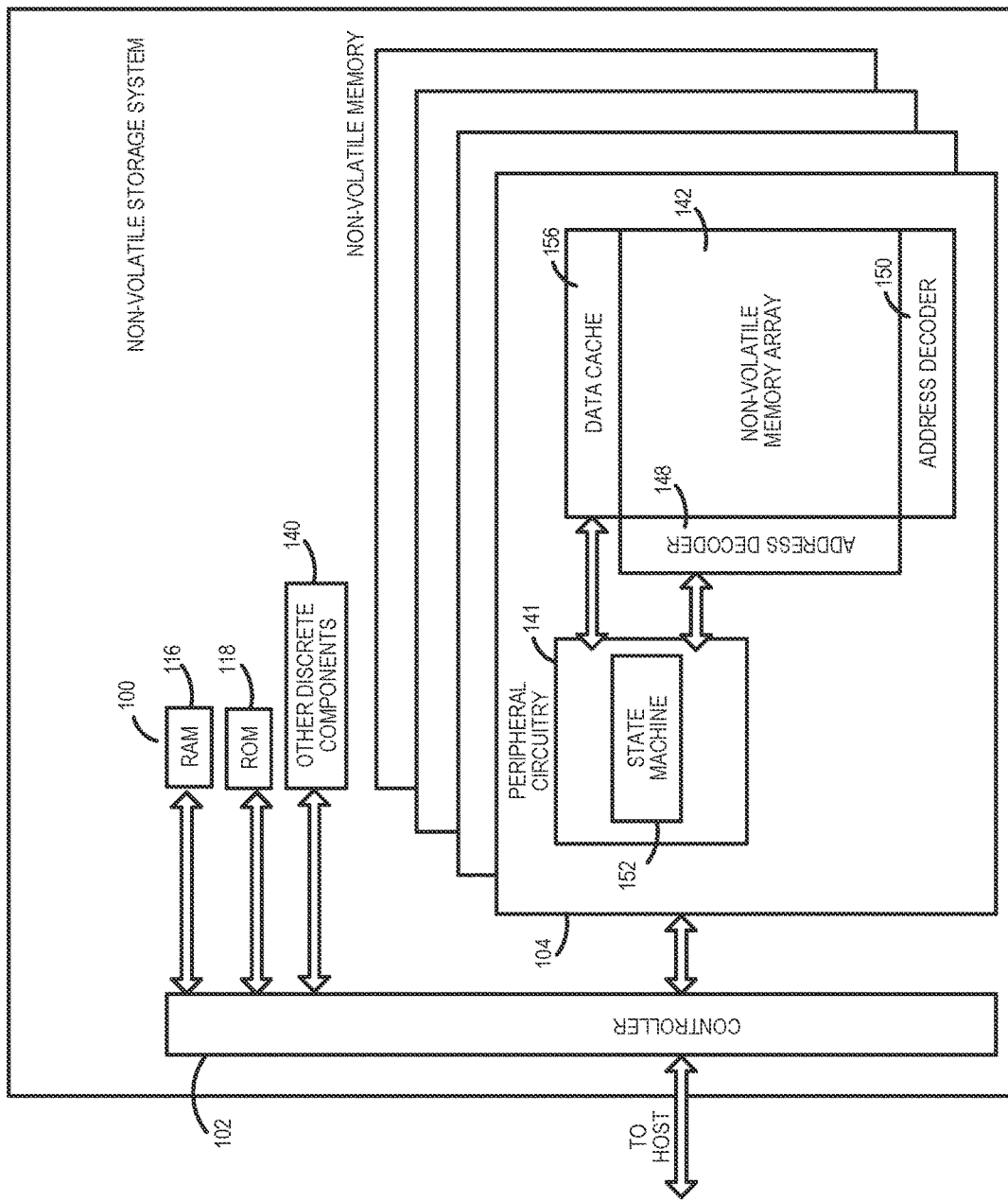
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
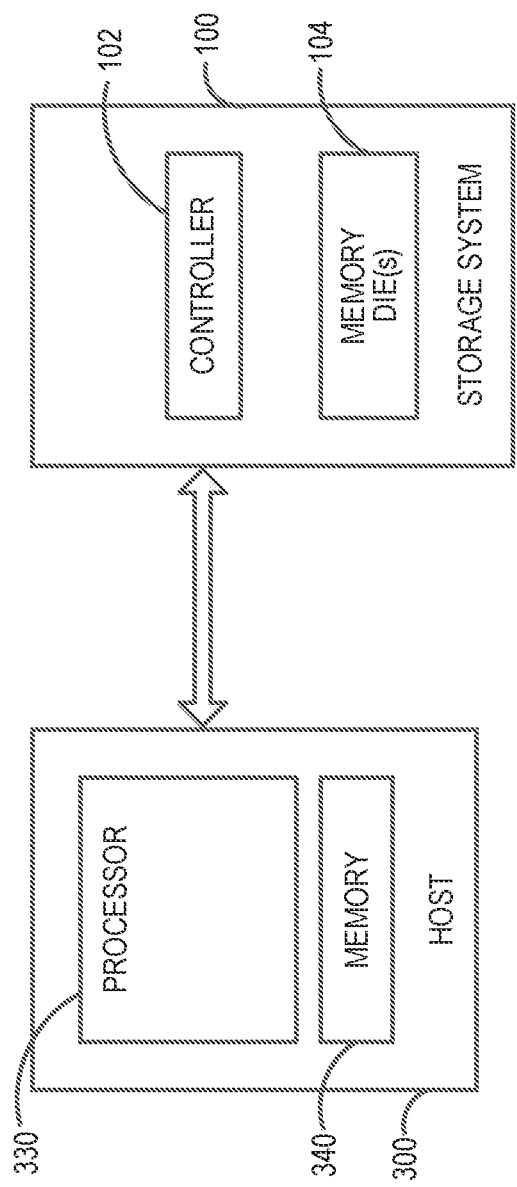
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

USB 3.2 Gen2×2 with Type C Interface is capable of dual-lane configuration and has a flip-ability feature (i.e., the host and data storage device are capable of operating in both orientations of connection of the Type C Connector. Cable orientation and lane detection are done based on a Type C channel configuration (CC) signal. From the USB-IF specification, a Type C Receptacle Connector shall have a pull-up resistor on both CC1 and CC2 signals, and a Type C Plug Connector shall have a pull-down resistor on CC1. It is the responsibility of the connector with the receptacle side to monitor the CC signal and detect the orientation of the Type C Plug.

When the host and the data storage device both implement a USB Type C Receptacle, a USB Type-C-plug-to-Type-C-plug cable is required to connect the host and the data storage device. In this case, orientation detection and lane configuration happen based on the CC wire. The host can implement a pull-up resistor on CC1 and CC2 signals, and the data storage device can implement a pull-down resistor on CC1 and CC2 signals when the data storage device is based on a Type-C receptacle connector.

Figure 4:
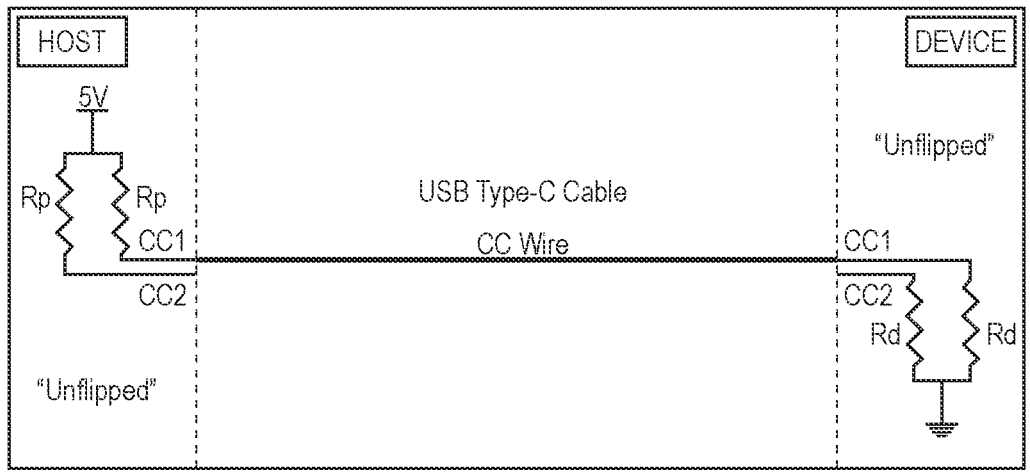
FIG. 4 is a circuit diagram of an embodiment where a host side and a data storage device side are un-flipped.
Figure 5:
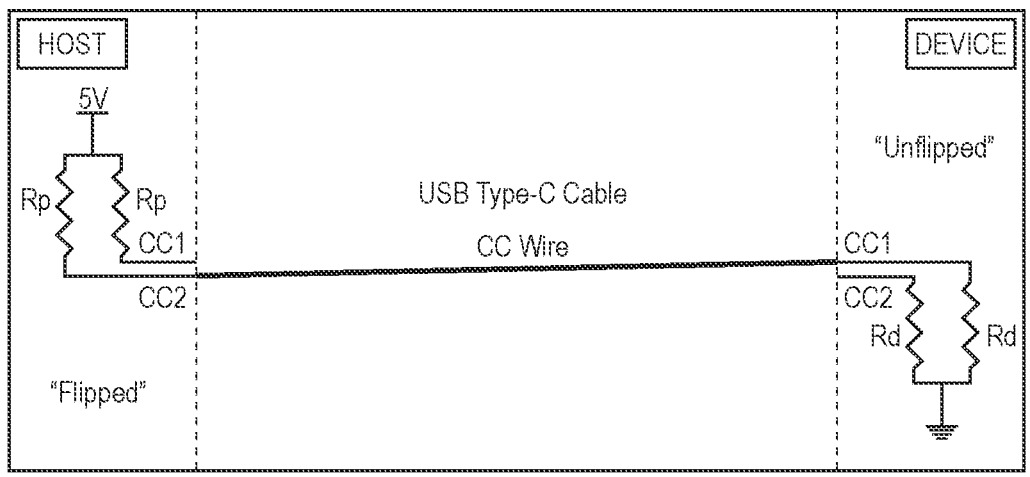
FIG. 5 is a circuit diagram of an embodiment where a host side is flipped and a data storage device side is un-flipped.
Figure 6:
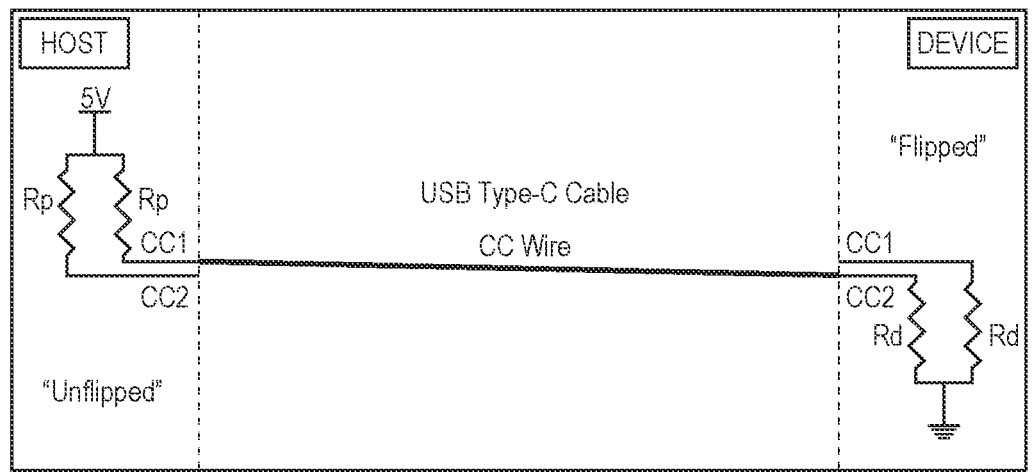
FIG. 6 is a circuit diagram of an embodiment where a host side is un-flipped and a data storage device side is flipped.
Figure 7:
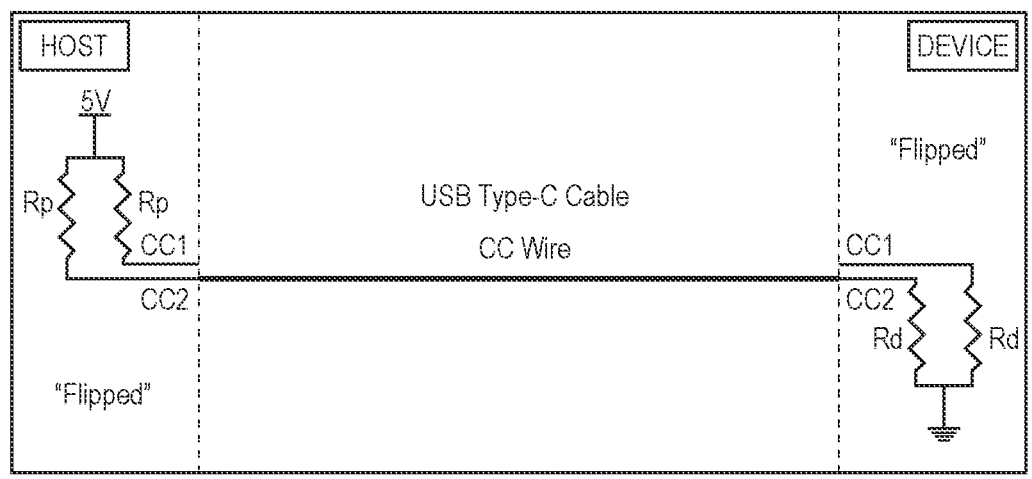
FIG. 7 is a circuit diagram of an embodiment where a host side and a data storage device side are flipped.

FIG. 4 is a circuit diagram of an embodiment where a host side and a data storage device side are un-flipped. FIG. 5 is a circuit diagram of an embodiment where a host side is flipped and a data storage device side is un-flipped. FIG. 6 is a circuit diagram of an embodiment where a host side is un-flipped and a data storage device side is flipped. FIG. 7 is a circuit diagram of an embodiment where a host side and a data storage device side are flipped.

The following table explains the orientation detection and configuration lane setting based on cable insertion:

| Host side Cable orientation | Device side Cable orientation | Host Connectivity | Device Connectivity | Host Configuration | Device Configuration |
|---|---|---|---|---|---|
| Un-flipped | Un-flipped | CC1 to CC | CC1 to CC | Lane 0 Config | Lane 0 Config |
| Flipped | Un-flipped | CC2 to CC | CC1 to CC | Lane 1 Config | Lane 0 Config |
| Un-flipped | Flipped | CC1 to CC | CC2 to CC | Lane 0 Config | Lane 1 Config |
| Flipped | Flipped | CC2 to CC | CC2 to CC | Lane 1 Config | Lane 1 Config |

Figure 8:
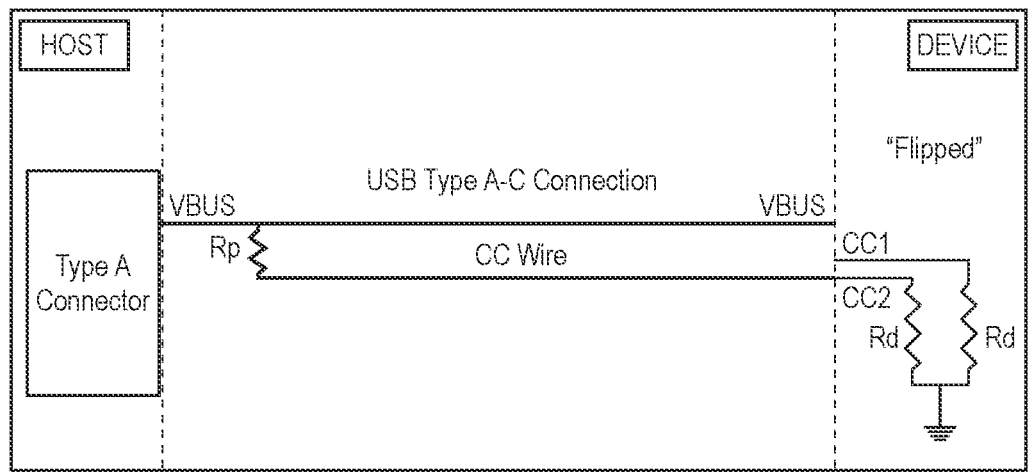
FIG. 8 is a circuit diagram of an embodiment where a data storage device side is flipped.
Figure 9:
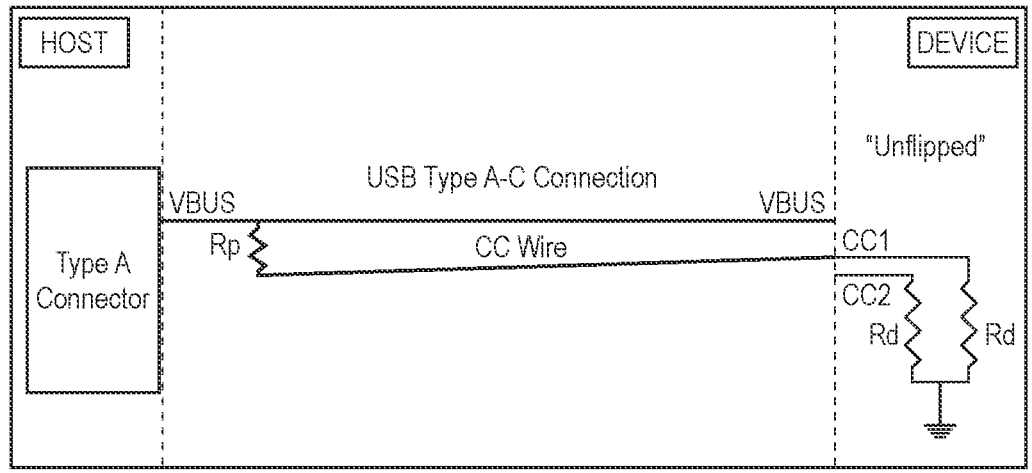
FIG. 9 is a circuit diagram of an embodiment where a data storage device side is un-flipped.

With a standard Type C plug and both the host and the data storage device supporting CC logic, the detection and configuration of lanes based on orientation is the responsibility of the host, which has a Type C Receptacle. In case a data storage device with a Type C receptacle needs to be connected to a host that has a Type A receptacle, an additional Type-C-plug-to-Type-A cable is required and should provide a pull-up on the CC wire to VBUS. FIG. 8 is a circuit diagram of an embodiment where a data storage device side is flipped, and FIG. 9 is a circuit diagram of an embodiment where a data storage device side is un-flipped. The responsibility of CC orientation detection and configuration of lanes falls on the data storage device.

The following table explains the orientation detection on the data storage device side

| Device-Side Cable Orientation | Device Connectivity | Device Configuration |
|---|---|---|
| Un-Flipped | CC1 to CC | Lane 0 Config |
| Flipped | CC2 to CC | Lane 1 Config |

Figure 10:
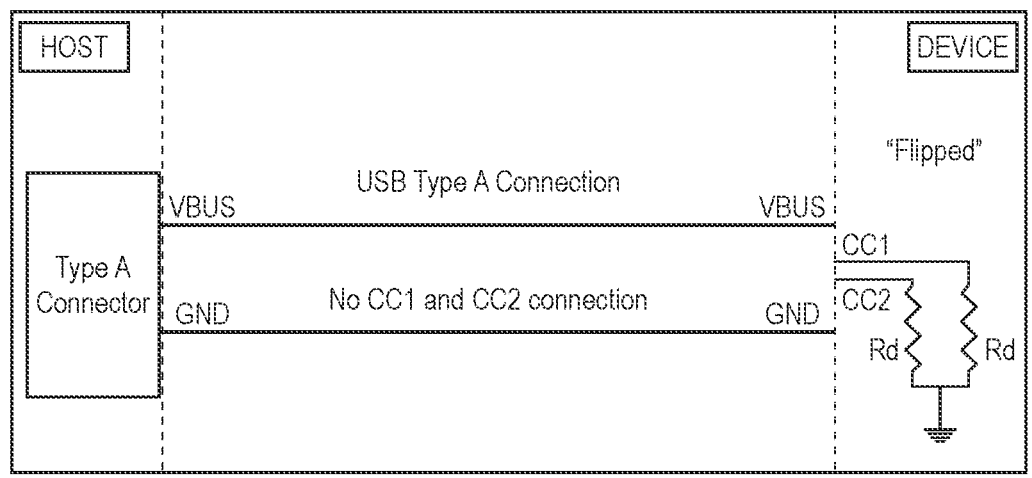
FIG. 10 is a circuit diagram of a Type A cable interface of an embodiment.

In case of unmarked, non-standard, or a Type-C-to-Type-A adaptor without a pull-up resistor (Rp) configuration, a data storage device with a Type C receptacle cannot identify the orientation as CC logic will not be able to find the pull-up resistor. A lack of an Rp resistor in a Type A Cable interface (see FIG. 10) can cause device lane detection to fail because the data storage device will not be able to detect the orientation. Another reason for failure is debouncing on CC lines due to noise and a plug-in event that requires an analog detection circuit in the device CC logic (which is an expensive solution). Yet another reason for failure is if the CC state is invalid and the data storage device fails to select a lane, which causes the data storage device to not be recognized at the host side.

This can present several problems. For example, legacy test infrastructure is designed with a Type A connector, and non-standard single-lane Type C adaptors are restricted to work only in one direction. Due to simpler ROM-mode firmware, complex techniques are not involved to have a robust CC detection logic to handle debouncing. Handling of the qualification process leads to a manual process, and additional costs are involved owing to cable markings. Cable orientation needs to be maintained all times, leading to slower executions. Using a third-party solution with CC handling is expensive for the overall product, as even CC logic in an application-specific integrated circuit (ASIC) comes with additional cost.

Some USB bridges may have some implementation of a timing-based approach. However, USB lane detection fails one out of ten times (10% failure), and the data storage device may not be able to detect cable orientation correctly and may fail in configuring the lane, resulting in the host not recognizing the data storage device. Depending on timing to check the CC status and in case the status is not proper or takes time to stabilize, the data storage device detection fails in the host. As of now, no data storage device controller is supporting USB Type C dual-lane configuration. Also, in some environments, Type C detection hardware is used to check the cable orientation and select the lane configuration.

The following embodiments can be used to allow a data storage device to perform orientation detection and lane configuration during development and testing. (As used herein, a lane (or channel) refers to a physical connection (e.g., wire(s), signal trace(s)) used as a communication mechanism between the host 300 and the data storage device 100.) Using these embodiments can save significant infrastructure cost and cost of the final end product provided to the user because the user can use non-standard, less expensive cables, which do not support an orientation-handling circuit. For example, these embodiments can be used to detect channel configuration (CC) at the data storage device side for lane detection without a Rp in the cable. In one example implementation, these embodiments can provide a soft-debounce design and firmware CC logic for USB Type C Lane detection and configuration in a controller ROM mode with a USB Type A Host.

In one embodiment, the controller 102 of the data storage device 100 checks the USB Type C channel configuration state and, based on a valid channel configuration, will perform lane selection. In case the CC state is invalid, the controller 102 can re-check the state after a delay and then perform lane configuration. This process is repeated a number of times, and if the CC state is still invalid, the controller 102 can use a default LANE1 configuration. In case the CC states are noisy (e.g., due to a faulty cable that causes the state to be invalid), a default LANE1 can be used (e.g., using an e-fuse).

Figure 11:
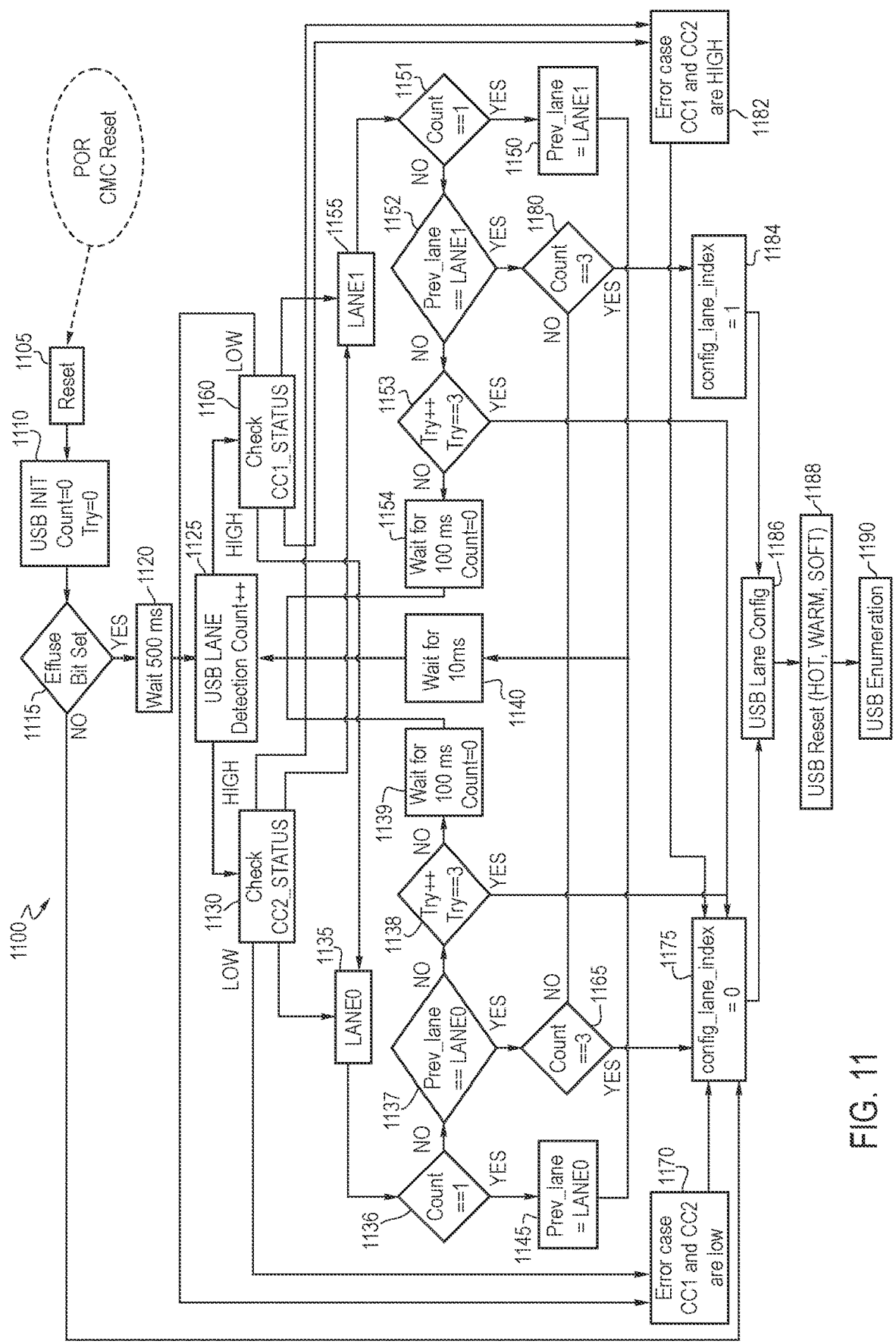
FIG. 11 is a flow chart of a channel configuration detection method of an embodiment.
Figure 12:
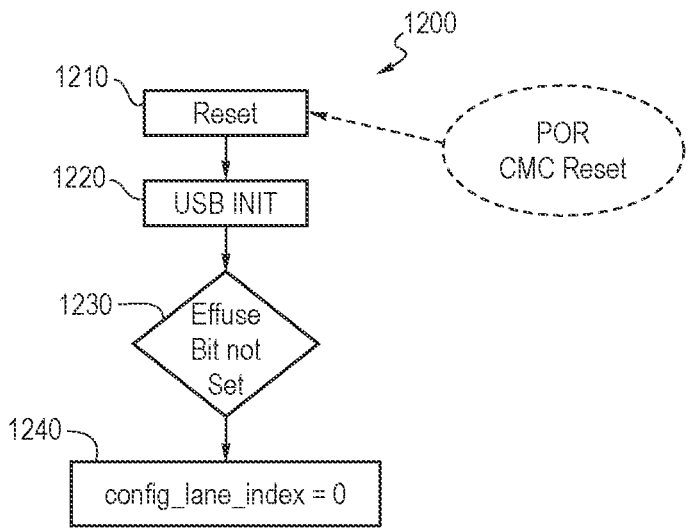
FIG. 12 is a flow chart of a lane selection method of an embodiment.

In one embodiment, there are main two CC state registers associated with LANE0 and LANE1. These registers are checked to determine the CC state, and, based on the value, lane selection is done. FIG. 11 is a flow chart of a channel configuration detection method of an embodiment. As shown in FIG. 11, after some initialization steps (acts 1105-1125), the status is checked of either CC1 or CC2 (acts 1130 and 1160). If LANE0 is selected (act 1135), a number of acts are performed (acts 1136-1119, 1170, 1175). However, if LANE1 is selected (act 1155), a number of other acts are performed (acts 1151-1154, 1180, 1182, 1184). Finally, lane configuration is performed (act 1186), the data storage device 100 is reset (act 1188), and enumeration takes place (act 1190). So, in this method, upon receiving a system-on-chip (SOC) reset via CMC or POR after connecting the data storage device 100 to the host 300, the CC states gets updated. Based on the e-fuse configuration, a default lane configuration or lane detection is decided. If the e-fuse bit is not set, Lane0 is configured as described in the flow chart in FIG. 12. As shown in FIG. 12, upon a reset (act 1210), the data storage device 100 (here, a USB drive) is initialized (act 1220). Then, a determination is made on whether the e-fuse bit is set (act 1230). If the e-fuse bit is not set, the configuration lane index is set to zero (act 1240).

Figure 13:
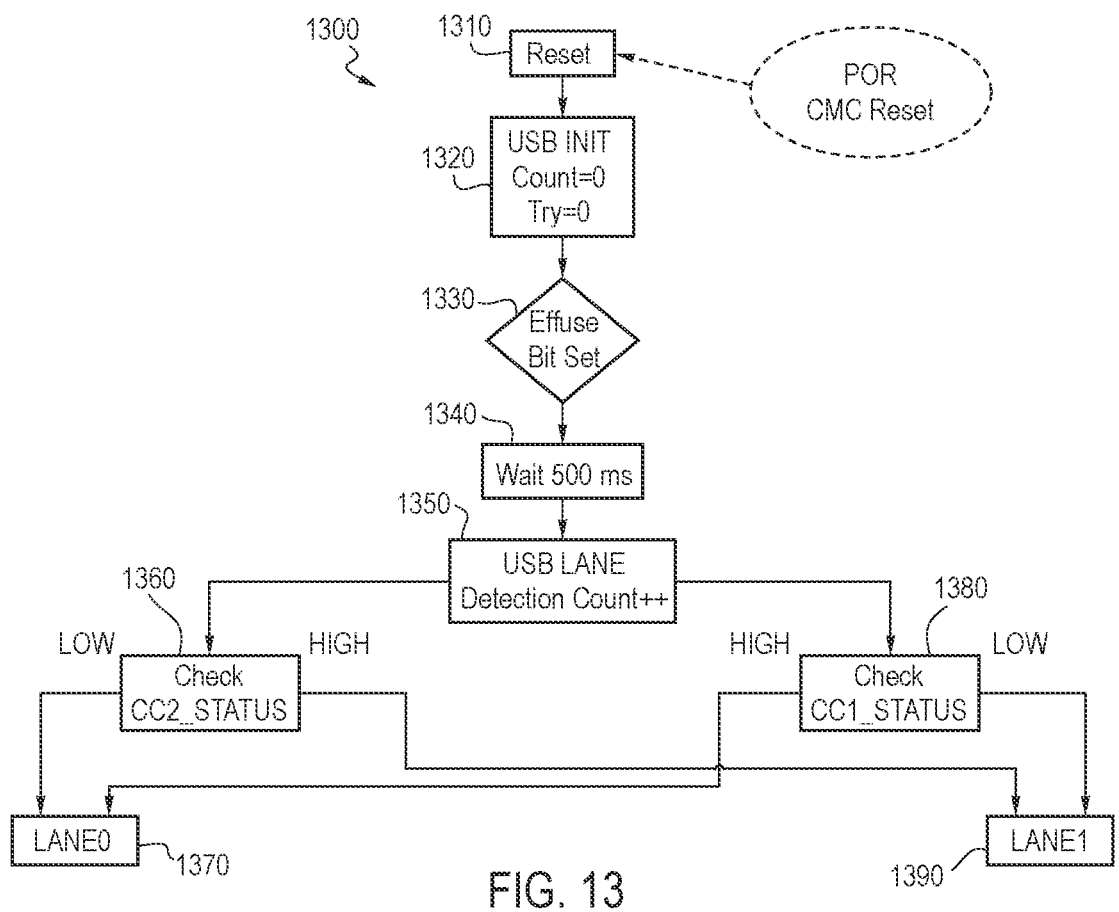
FIG. 13 is a flow chart of a lane detection method of an embodiment.

If the e-fuse bit is set, the CC1 and CC2 states are checked to determine the lane as described in the flow chart of FIG. 13. As shown in FIG. 13, upon a reset (act 1310), the data storage device 100 (here, a USB drive) is initialized (act 1320). Then, a determination is made on whether the e-fuse bit is set (act 3230). If the e-fuse bit is set, after a period of time (act 1340), a lane detection count is increased (act 1150), and the statuses of CC1 and CC2 are checked (act 1360 and 1380), which determine if LANE0 or LANE1 is used (acts 1370, 1390).

Figure 14:
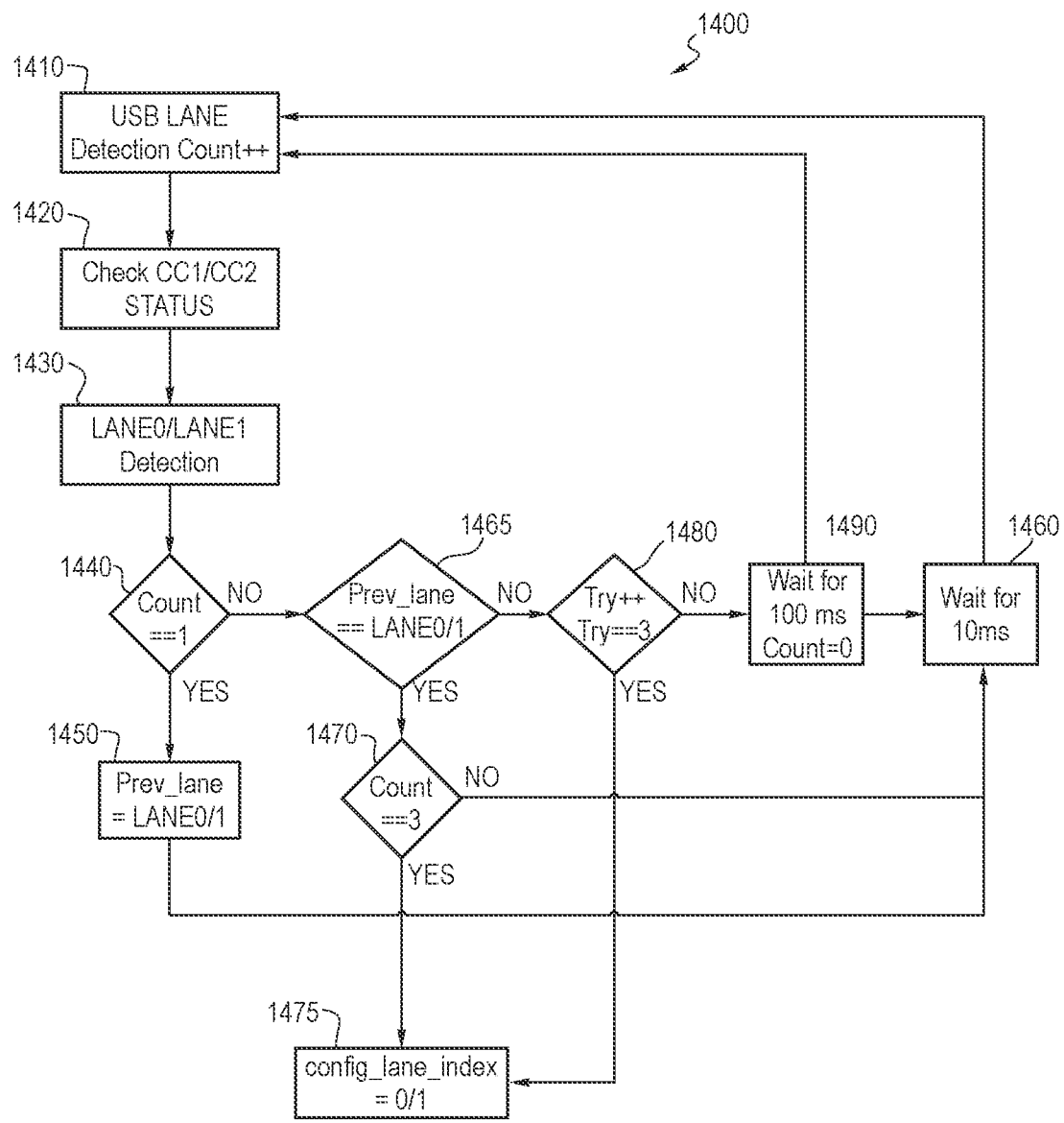
FIG. 14 is a flow chart of a lane configuration method of an embodiment.

Based on lane detection, further retries are done to confirm if the lane detection is proper, as described in the flow chart of FIG. 14. As shown in FIG. 14, the lane detection count is increased (act 1410), and the CC1 and CC2 statuses are checked (act 1420), followed by lane detection (act 1430). A determination is then made as to whether the count equals one (act 1440). If the count equals one, the previous lane is set to LANE0/1 (act 1450), and, after a period of time (act 1460), the method loops back to act 1410. However, if the count does not equal one, a determination is made as to whether the previous lane is set to LANE0/1 (act 1465). If the previous lane is set to LANE0/1, a determination is made as to whether the count is set to three (act 1470). If the count is set to three, the configuration lane index is set to 0/1 (act 1475). If the count is not set to three, after a period of time (act 1460), the method loops back to act 1410. However, if the previous lane is not set to LANE0/1, a determination is made as to whether three tries have been made (act 1480). If three tries have been made, the method loops to act 1475. However, if three tries have not been made, after a period of time (act 1460), the method loops back to act 1410.

Figure 15:
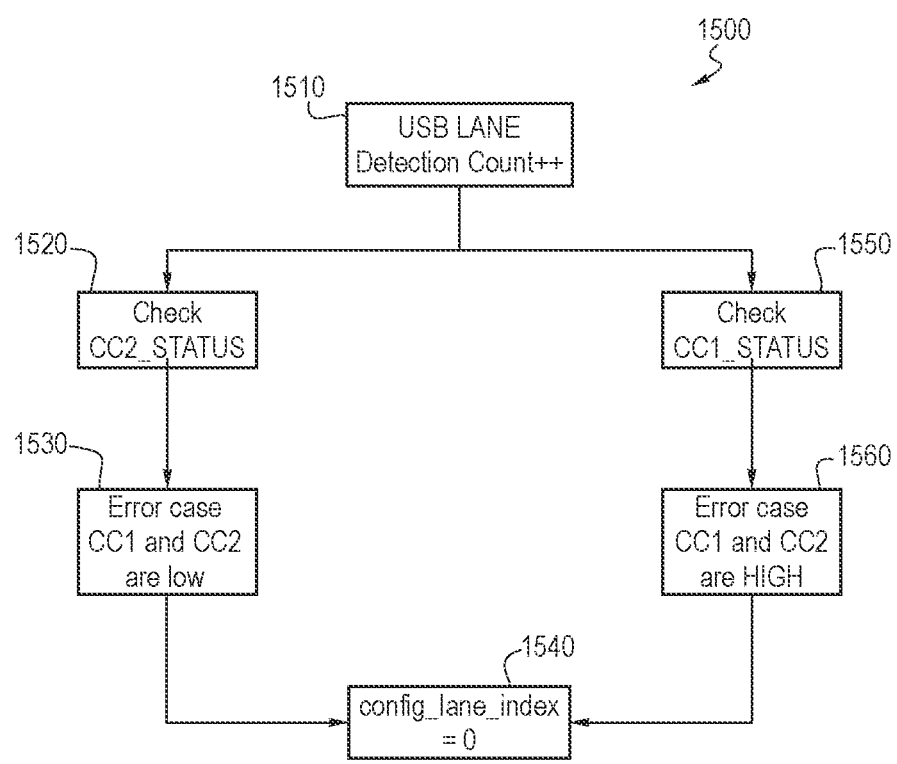
FIG. 15 is a flow chart of an error case configuration method of an embodiment.

In case of an erroneous situation, LANE0 is programmed by default, as described in FIG. 15. As shown in FIG. 15, after an increase in the lane detection count (act 1510), the statuses of CC1 and CC2 are checked (acts 1520 and 1550). In an error case, CC1 and CC2 are both low or both high (acts 1530 and 1560), and the configuration lane index is set to zero (act 1540).

In lane-detection logic, the configuration state of both channels associated with the lanes is read, and, as indicated in the below table, combinations can be derived for lane selection:

| S.no. | CASE | HOST | CABLE | DEVICE | CC2 | CC1 | CONFIG |
|---|---|---|---|---|---|---|---|
| 1 | Un flipped | TYPE C 2 lane | TYPEC-TYPEC | TYPE C 2 lane | LOW | HIGH | LANE0 |
|  | flipped | TYPE C 2 lane | TYPEC-TYPEC | TYPE C 2 lane | HIGH | LOW | LANE1 |
| 3 | Un flipped | TYPE C 1 lane | TYPEC-TYPEC | TYPE C 2 lane | LOW | HIGH | LANE0 |
|  | flipped | TYPE CI lane | TYPEC-TYPEC | TYPE C 2 lane | HIGH | LOW | LANE1 |
|  | TYPEA | TYPE A 1 lane | TYPEA-TYPEC | TYPE C 2 lane | LOW | HIGH | LANE0 |
|  | TYPEA | TYPE A 1 lane | TYPEA-TYPEC(flipped) | TYPE C 2 lane | HIGH | LOW | LANE1 |
|  | TYPEA | TYPE A 1 lane | N/A | TYPE A 1 lane | LOW | HIGH | LANE0 |
|  | Errorneous0 | N/A | N/A | N/A | LOW | LOW | LANE0 |
| 9 | Errorneous1 | N/A | N/A | N/A | HIGH | HIGH | LANE0 |

In this example, based on the CC2 and CC1 state, the controller 102 can check the state three times. If the state is the same in all the cases, the corresponding lane can be configured in USB MAC. Between each check, there can be a delay that can be decided during design validation or can be programmed by using an e-fuse setting as well. If the CC0 and CC1 states are not the same among the checks, the whole process can be tried again for a maximum of three times (other numbers can be used). In the event that the states do not become stable at all after the maximum number of attempts, LANE0 can be selected as a default. In this case, cable orientation can be maintained so that the host 300 can detect the data storage device 100 on LANE0. In one example implementation, the entire logic can finish within 500 ms. In case the delay is not sufficient due to varied reasons, such as link stability, the cable not being plugged in correctly, etc., delays can be reprogrammed.

There are several advantages associated with these embodiments. For example, these embodiments can provide a cost-effective solution as the logic can be implemented in firmware ROM code, eliminate manual errors in the qualification and testing process, eliminate the need to check TYPE-C cable orientation, reduce the setup time in the production line based on cable orientation, allow quick (e.g., within 500 ms) detection of cable orientation or fall back to a single-lane configuration, save the cost of additional hardware by using soft logic, eliminate the cost of execution because of no cable orientation handling, provide use of failsafe protection with an e-fuse implementation, provide use of an e-fuse to safeguard a single lane in case of CC state issues, ensure lane detection (in case of faulty cables or noisy signals, default LANE0 can be selected), and flip the orientation of the cable in case lane detection is not happening.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory;
    an interface configured to couple with a cable; and
    a controller configured to communicate with the memory and the interface and further configured to:
        detect whether the cable is providing a first channel configuration signal that indicates that the cable is in a first cable orientation or a second channel configuration signal that indicates that the cable is in a second cable orientation;
        in response to detecting that the cable is providing the first channel configuration signal, use a first lane configuration to communicate with a host via the cable;
        in response to detecting that the cable is providing the second channel configuration signal, use a second lane configuration to communicate with the host via the cable; and
        in response to detecting that the cable is providing neither the first nor the second channel configuration signal either due to a lack of an orientation-handling circuit in the cable or due to the cable comprising the orientation-handling circuit but the first or the second channel configuration signal being undetectable due to noise or invalid information, use a default lane configuration to communicate with the host via the cable.

2. The data storage device of claim 1, wherein the controller is further configured to check for the first and second channel configuration signals a threshold number of times before using the default lane configuration.

3. The data storage device of claim 2, wherein the controller is further configured to insert a delay between the checking for the first channel configuration signal and the checking for the second channel configuration signal.

4. The data storage device of claim 1, wherein the interface comprises a pull-down resistor.

5. The data storage device of claim 1, wherein the interface comprises a universal serial bus Type C interface.

6. The data storage device of claim 5, wherein an interface in the host comprises a universal serial bus Type A interface.

7. The data storage device of claim 1, wherein the default lane configuration is set in a fuse.

8. The data storage device of claim 1, wherein the memory comprises a three-dimensional memory.

9. A method comprising:
    performing the following in a data storage device comprising an interface and a memory:
        detecting whether a cable connected with the data storage device is providing a first cable orientation signal or a second cable orientation signal;
        in response to detecting that the cable is providing the first cable orientation signal, using a first channel configuration to communicate with a host via the cable;
        in response to detecting that the cable is providing the second cable orientation signal, using a second channel configuration to communicate with the host via the cable; and
        in response to detecting that the cable is providing neither the first nor the second cable orientation signals either due to a lack of an orientation-handling circuit in the cable or due to the cable comprising the orientation-handling circuit but the first or the second channel configuration signal being undetectable due to noise or invalid information, using a default channel configuration to communicate with the host via the cable.

10. The method of claim 9, further comprising checking for the first and second cable orientation signals a threshold number of times before using the default channel configuration.

11. The method of claim 10, further comprising inserting a delay between the checking for the first channel configuration signal and the checking for the second channel configuration signal.

12. The method of claim 9, wherein the interface comprises a pull-down resistor.

13. The method of claim 9, wherein the interface comprises a universal serial bus Type C interface.

14. The method of claim 13, wherein an interface in the host comprises a universal serial bus Type A interface.

15. The method of claim 9, wherein the default channel configuration is set in a fuse in the data storage device.

16. A data storage device comprising:
    a memory;
    an interface configured to couple with a cable;
    means for detecting whether the cable is providing a first channel configuration signal that indicates that the cable is in a first cable orientation or a second channel configuration signal that indicates that the cable is in a second cable orientation; and
    means for using a default lane configuration to communicate with a host via the cable in response to detecting that the cable is providing neither the first nor the second channel configuration signal either due to a lack of an orientation-handling circuit in the cable or due to the cable comprising the orientation-handling circuit but the first or the second channel configuration signal being undetectable due to noise or invalid information.

17. The data storage device of claim 1, wherein the orientation-handling circuit comprises a pull-up resistor.

18. The method of claim 9, wherein the orientation-handling circuit comprises a pull-up resistor.

* * * * *